United States Patent [19]
Barlow et al.

[11] Patent Number: 5,411,818
[45] Date of Patent: May 2, 1995

[54] PERIMETER SEAL ON BIPOLAR WALLS FOR USE IN HIGH TEMPERATURE MOLTEN ELECTROLYTE BATTERIES

[75] Inventors: Geoffrey Barlow, South Russell; Steven J. Specht, Concord, both of Ohio

[73] Assignee: Westinghouse Electric Corporation, Pittsburgh, Pa.

[21] Appl. No.: 137,329

[22] Filed: Oct. 18, 1993

[51] Int. Cl.⁶ ............................................. H01M 2/08
[52] U.S. Cl. ..................................... 429/185; 429/210
[58] Field of Search ............... 429/185, 210, 112, 199

[56] References Cited

U.S. PATENT DOCUMENTS

| | | | |
|---|---|---|---|
| 3,565,694 | 2/1971 | Chireau | 429/210 |
| 3,833,424 | 9/1974 | Louis et al. | 429/210 |
| 4,652,502 | 3/1987 | Breault et al. | 429/185 |
| 4,687,717 | 8/1987 | Kaun et al. | 429/152 |
| 5,162,172 | 11/1992 | Kaun | 429/185 |
| 5,254,415 | 10/1993 | Williams et al. | 429/185 |
| 5,264,305 | 11/1993 | Charkey | 429/210 |
| 5,306,582 | 4/1994 | Tanaka | 429/185 |
| 5,326,656 | 7/1994 | Meadows et al. | 429/210 |

FOREIGN PATENT DOCUMENTS 14461  1/1983  Japan ..................... 429/185

*Primary Examiner*—Wayne Langel

[57] ABSTRACT

An improved battery of the type formed of cells stacked in series, each cell comprised of a positive and a negative electrode that contain an electrolyte. The cells are separated from one another by respective bipolar walls. The seal material is affixed to and encapsulates an outer edge of each bipolar wall. The battery preferably also includes a continuous insulating gasket provided around the periphery of each cell. Each gasket opening to a first end and opening to a second end opposite the first end. The first gasket end is in contact with the seal material of a bipolar wall and the second gasket end is in contact with the seal material of another bipolar wall with the electrodes being disposed within the gasket.

18 Claims, 3 Drawing Sheets

PERIMETER SEAL ON BIPOLAR WALLS FOR USE IN HIGH TEMPERATURE MOLTEN ELECTROLYTE BATTERIES

BACKGROUND OF THE INVENTION

1. Field of the Invention

This invention relates to improvements in series stacked multicell batteries, and more particularly to preventing ionically conductive paths from forming between adjacent cells and the battery case.

2. Description of the Prior Art

When constructing practical electrochemical cells in batteries there are two basic ways in which electrodes can be connected inside the cell or battery module case. These are series and parallel connections. In a bipolar battery design, the electrodes are hooked together in series, thus the voltage of the stack is n times that of a single cell, where n is equal to the number of cells in the stack. Each cell comprises a positive and a negative electrode separated from one another by some ionically conducting material.

To build a long life rechargeable bipolar cell stack requires that there be no electrolyte path (i.e., no ionic leakage) formed between adjacent cells around the bipolar wall. This ensures that all of the current flow through the bipolar wall should be electronic in nature and there should be no ionic flow. Thus, the practical problem in building bipolar cell stacks is how to prevent liquid electrolyte paths from developing between adjacent cells. Because of the inability to completely contain the electrolyte within each cell, maximum performance and life of bipolar batteries has not yet been realized to date.

Referring no FIG. 1, which shows a prior art cell stack, the positive and negative electrodes of each stack contain an electrolyte which is liquid at the operating temperature. The bipolar wall shown in FIG. 1 separates adjacent cells and is designed to allow an electronic path between adjacent cells while not allowing an ionic path. If a path of electrolyte is allowed to travel around the bipolar wall, an ionic short develops reducing the effectiveness of the battery. When the liquid electrolyte contacts the bipolar wall, it will wet the bipolar wall to varying degrees depending upon the composition of the electrolyte and the material from which the bipolar wall is constructed. When the liquid electrolyte runs completely across the surface of the bipolar wall, the wall is said to be wetted by the electrolyte. It is when the bipolar wall is wetted by the electrolyte that the electrolyte might travel in an undesirable path, shown in the figure, to the adjacent cell.

The ideal solution to the electrolyte leakage problem is to use a minimum amount of electrolyte which is completely contained within the individual electrodes and separator by capillary forces. In practice, however, this is almost impossible since more than this minimum amount of electrolyte is required to obtain the desired electrochemical performance from the battery.

The critical component to make a bipolar battery feasible is the development of a reliable bipolar wall edge seal to prevent the migration of electrolyte between adjacent cells and from the cells to the module case wall. If electrolyte bridges across adjacent cells or to the conductive battery case, ionically conductive paths will be formed which will degrade the capacity of the affected cells and result in an imbalance in the cell stack with repetitive charge/discharge cycling and, ultimately, failure of the entire battery.

Others have attempted to solve this electrolyte containment problem by forming a hermetic seal around the perimeter of each cell thereby permanently isolating each cell from adjacent cells and from the battery case. This approach requires a sophisticated insulating material to metal bond between the cell hardware components. The insulating material must be capable of withstanding chemical, thermal and mechanical effects imposed by the cell stack under all operating and environmental conditions. The assembly of this type of seal will result in high fabricating costs and low reliability due to the large area which must be perfectly sealed. The mechanical loading on the insulating ceramic ring caused by thermal expansion of the components during heating and cooling may limit this type of hermetic seal design to circular configurations in relatively small sizes (i.e., five inches and under). This may impose severe packaging penalties and reduce the energy density for many potential battery applications. Therefore, alternative means are necessary to confine the electrolyte from migrating from the electrodes and separator around the bipolar wall.

SUMMARY OF THE INVENTION

We provide a nonhermetic seal design that will prevent the migration of electrolyte around the bipolar wall and thus prevent the formation of ionically conducting paths. A material that is nonwettable by the cell electrolyte is strategically placed around the cells at the periphery of the bipolar wall along an outer edge of each bipolar wall. The material is in intimate contact with the metallic bipolar wall and forms a continuous perimeter to contain any electrolyte which may flow over the surface of the bipolar wall from the cell components. Electrolyte migration to adjacent cells is thereby prevented by the nonwetting nature of the perimeter material. The preferred seal material is a flexible graphite foil.

The individual bipolar cells, with the bipolar wall perimeters encapsulated with flexible graphite foil, are stacked to form a battery. A spacer gasket made of insulating material is placed between adjacent cells to prevent the electronically conductive graphite materials from touching and shorting the cells. The insulating spacer material must be compatible with the cell environment at the battery operating temperature, remain an insulator over long periods of time and with greater than two volts of electric field. Typical insulating materials are boron nitride, boron nitride fibers that are either woven or embodied as a felt, aluminum nitride, magnesium oxide or combinations thereof.

In a second preferred seal embodiment, a layer of material is provided along a face of the bipolar wall between the bipolar wall and the positive electrode. The material is preferably fabricated from graphite, due to graphite being nonwettable and thus providing an additional barrier to electrolyte migration. Graphite also provides acceptable electronic conductivity necessary at the bipolar wall and assists in preventing corrosion of the metal bipolar wall.

The layer of material in the second preferred embodiment is preferably integral with the edge seal. However, the layer may be placed or sprayed onto the bipolar wall separately and independent from the edge seal. Furthermore, some or all of the bipolar walls may have a graphite layer and not be provided with an edge seal.

DETAILED DESCRIPTION OF THE PREFERRED EMBODIMENT

Figure 1:
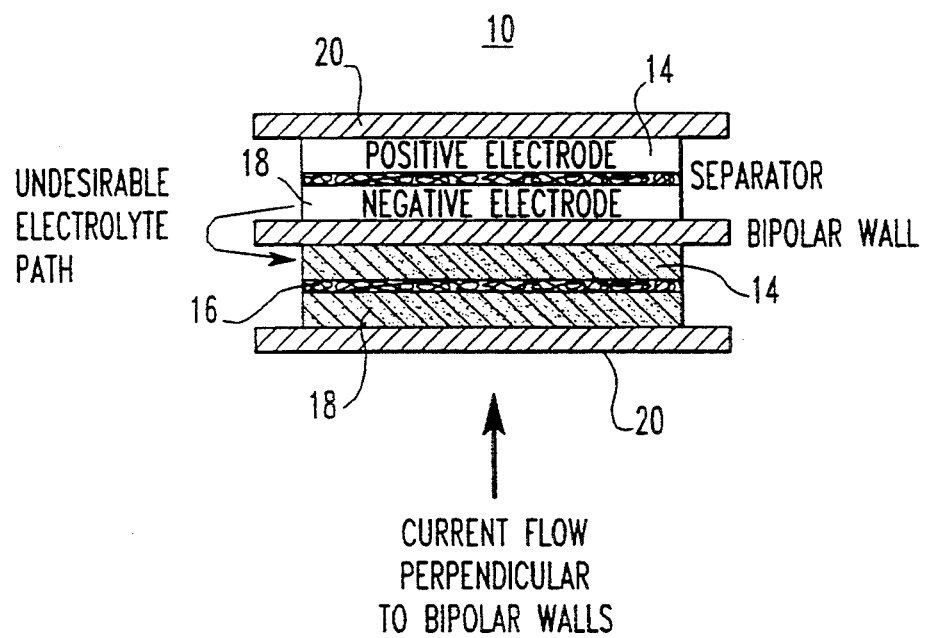
FIG. 1 is a schematic view of a prior art series stacked multicell battery.

A sealing arrangement is provided to prevent the migration of liquid electrolyte (shown in FIG. 1) between bipolar cells of a high temperature lithium alloy/metal sulfide battery. In these types of batteries, the electrolyte is typically a combination of several alkali halide salts which is liquid at the operating temperature.

Figure 2A:
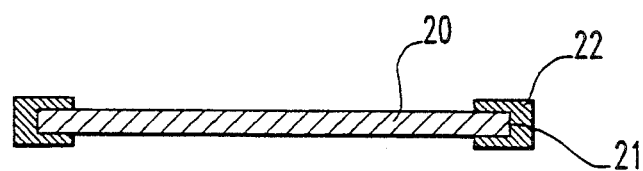
FIG. 2A is a side elevation view of a bipolar wall with a first preferred edge seal attached thereto.
Figure 2B:
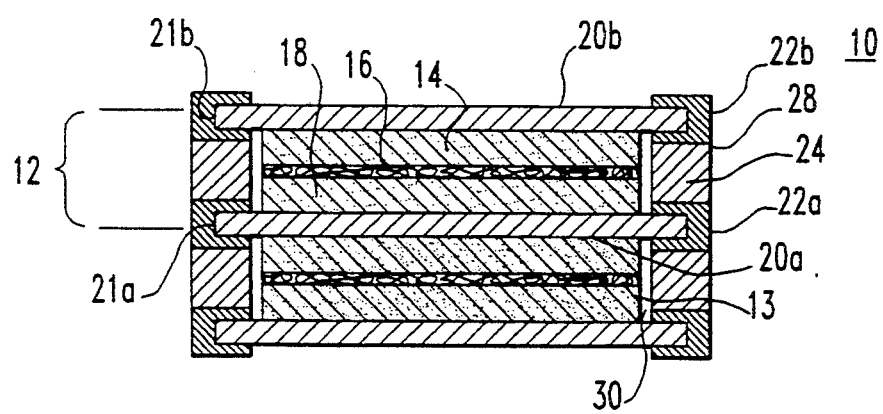
FIG. 2B is a cross sectional view taken in elevation of a first preferred edge seal as affixed to a multicell battery.

Referring first to FIGS. 2A and 2B, a first preferred edge seal 22 is shown. The edge seal 22 is affixed to a bipolar wall 20 which is then incorporated in a battery 10. The battery 10 comprises several cells 12 stacked in series. Each cell 12 comprises a positive electrode 14 and a negative electrode 18 containing an electrolyte as well as a separator 16 placed between the electrodes 14, 18. As can be seen best in FIG. 2A, an edge seal 22 is attached onto the outer edge 21 of each bipolar wall 20 to form a continuous seal. The edge seal 22 is attached to the bipolar walls 20 preferably by being pressed around the outer edge 21 of each bipolar wall 20. The edge seal 22 extends a short distance from the outer edge 21 along the opposed faces of a given bipolar wall so as to encapsulate the outer edge 21.

The edge seal 22 is made of a material that is nonwettable by the cell electrolyte. Thus, the edge seal 22 prevents liquid electrolyte migrating from the cell components (i.e., electrodes 14, 18 and separator 16) around the outer edge 21 of the bipolar wall 20.

As is shown in FIG. 2B, a given cell 12 is bordered by bipolar walls 20a and 20b. Bipolar wall 20a has an edge seal 22a attached thereto. Similarly, bipolar wall 20b has an edge seal 22b attached thereto.

As can be seen best in FIG. 2B, an insulating spacer, or gasket 24, is preferably provided around the periphery 13 of each cell 12 to cooperate with the edge seals 22 to reduce the migration of electrolyte between cells 12. Each gasket 24 is placed around each cell 12 between the bipolar walls 20 bordering the cell 12. Each gasket 24 has a first end 26 and a second end 28 opposite to the first end 26. When the gasket 24 is placed in position, the gasket first end 26 lies in contact with edge seal 22a and the gasket second end 28 lies in contact with edge seal 22b. Each gasket additionally insulates edge seal material from contacting other edge seal material and possibly forming a short circuit as some possibly forming a short circuit as some preferred edge seal materials are electrically conductive.

Each gasket 24 is preferably adhered at each end to the edge seal 22 on the bipolar wall 20. However, any or all of the gaskets 24 may instead be adhered at only one end to an edge seal 22. Alternatively, the gaskets 24 may be placed between the bipolar walls 20 in contact with the edge seals 22 and held in place by the compressive force applied on the cell stack.

It is further preferred that each edge seal 22 and each gasket 24 be located at some distance from the periphery of of the cell components. With the edge seals 22 and gaskets 24 at a distance from the cell periphery a space or cavity 30 is formed therebetween. The cavity 30 is provided to collect any excess electrolyte which may have flowed from the active electrodes during charge/discharge cycling.

The edge seal 22 may be formed from materials other than flexible graphite. Such alternative materials are a solid graphite sheet, graphite powder, and a graphite composite material to provide greater strength. Also, the edge seal may be prepared as a cement in which a binder is mixed with graphite powder, a nonwettable ceramic, a high melt salt or a combination of these. The ceramics that may be used for an edge seal cement include boron nitride and titanium nitride. The high melt salts that may be used for the edge seal cement include lithium fluoride, lithium chloride and potassium chloride.

In forming the edge seal 22, the flexible graphite sheet may be folded and shaped directly onto the bipolar wall 20. The graphite powder may be pressed around the bipolar wall edge 21 in a mold. Alternatively, the edge seal 22 may be formed by depositing graphite directly onto the metal bipolar wall 20 using CVD (chemical vapor deposition, which is a known deposition technique) or other similar methods.

The insulating gasket 24 is preferably made of boron nitride felt. However, alternative materials may be used as the electrically insulating material for the gasket 24. The insulating material should be chemically inert under cell potentials and at cell operating temperatures. Also, the gasket material should not permit electronic conduction. Furthermore, the insulating material for the gasket 24 should have the ability to be fabricated in thin, large rings which meet the mechanical strength requirements of the bipolar battery design. Materials suitable for such an insulating gasket 24 include aluminum nitride, boron nitride, magnesium oxide, silicon nitride, yttrium oxide, beryllium oxide. Also suitable are high melting salts such as LiF, LiCl and KCl. Mixtures or composites of these or other materials may be suitable so long as the material or materials chosen provide the desired material characteristics.

Figure 3A:
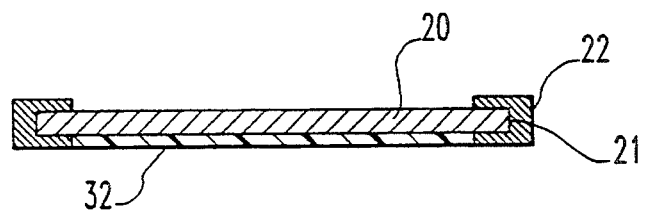
FIG. 3A is a side elevation view of a bipolar wall with a second preferred edge seal attached thereto.
Figure 3B:
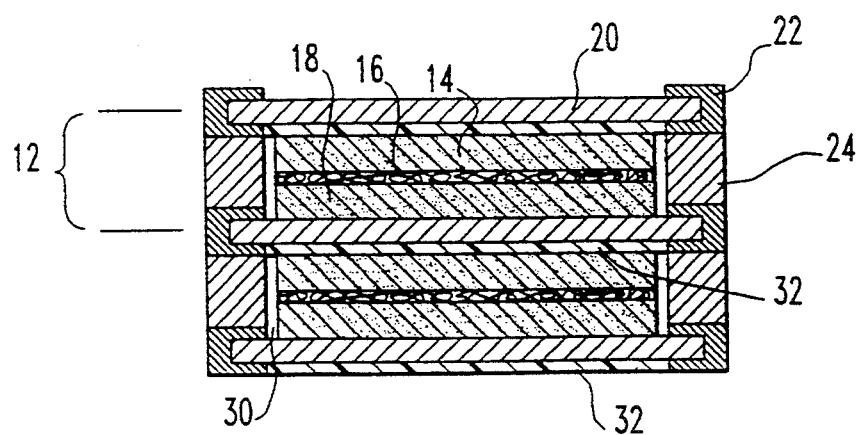
FIG. 3B is a cross sectional view taken in elevation of a second preferred edge seal as affixed to a multicell battery.

Referring next to FIGS. 3A and 3B, a second preferred edge seal 22 is shown that is affixed to bipolar walls 20 of a multicell battery 10. In this embodiment, a thin layer 32 of material is provided along a face of the bipolar wall 20 between the bipolar wall 20 and the positive electrode 14. Because current must pass through the bipolar wall 20, the layer 32 must be made of a material that will allow electrical conduction therethrough. Graphite provides an acceptable amount of conduction for most applications when applied as a thin layer and is therefore the preferred material for the layer 32.

An impervious layer 32 of graphite on one face of the bipolar wall 20 provides an additional barrier to the leakage of electrolyte between adjacent cells 12. Also, the composite bipolar wall 20 (metal bipolar wall with the layer of graphite) allows the use of less expensive metals than molybdenum, such as steel or nickel, for the bipolar wall 20 because the corrosive nature of the positive electrode 14 is isolated from the metal by the inert graphite sheet.

This embodiment preferably uses a sheet of flexible graphite as the layer 32 to completely cover the face of the bipolar wall 20. The sheet of flexible graphite may be integral with the edge seal 22 and extend from the outer edge 21 of the bipolar wall 20, covering the bipolar wall face. Thus, the edge seal 22 encapsulates the peripheral edge 21 of the bipolar wall 20 similar to the first embodiment.

In the second embodiment, the layer 32 of graphite may be sprayed onto the bipolar wall 20 as a thin coating. In this alternative the layer 32 may be applied first to the bipolar wall 20. Then, the edge seal 22 may be more securely held onto the outer edge 21 of the bipolar wall 20 by being adhered to the layer 32. It is clear that when the layer 32 is applied first as a paint, the edge seal 22 may be any material and need not be graphite. Furthermore, although it is preferred in the second embodiment that the layer 32 be applied in cooperation with an edge seal 22 for each bipolar wall 20, some or all of the bipolar walls 20 of the battery stack 10 may have the layer 32 of graphite without having an edge seal 22.

Variations of the preferred embodiment may be provided. For example, the preferred gasket is fabricated as an independent component and is then placed around a cell between bipolar walls. However, the insulating gasket may be formed as an integral part of the edge seal by deposition of an insulating material directly only the graphite edge seal. An example of this is the deposition of boron nitride by CVD or sputtering onto the surface of the graphite film away from the metal bipolar walls, thereby electrically insulating adjacent cells. Another example would be to plasma spray a high melting point salt or mixture of salt in ceramic onto the edge seal material to provide electrical insulation.

While certain present preferred embodiments have been shown and described, it is distinctly understood that the invention is not limited thereto but may be otherwise embodied within the scope of the following claims.

We claim:

1. A battery comprised of cells stacked in series, each cell having a positive and a negative electrode and separator that contain an electrolyte, each cell having an outer periphery and each cell being separated from adjacent cells by a bipolar wall such that, each cell is bounded by first and second bipolar walls; and
   a plurality of continuous edge seals, each edge seal being affixed to and encapsulating an outer edge of a bipolar wall.

2. The battery of claim 1 wherein the edge seal is made of graphite.

3. The battery of claim 2 wherein the graphite is prepared as a flexible sheet.

4. The battery of claim 2 further comprising a layer of seal material provided upon a face of the bipolar wall between the bipolar wall and an adjacent electrode.

5. The battery of claim 4 wherein the layer of seal material is integral with the edge seal.

6. The battery of claim 4 wherein the layer of seal material is sprayed onto the bipolar wall.

7. The battery of claim 1 wherein the edge seal is prepared as a cement.

8. The battery of claim 7 wherein the cement is comprised of a binder mixed with a nonwettable ceramic.

9. The battery of claim 8 wherein the ceramic is boron nitride.

10. The battery of claim 8 wherein the binder is also mixed with a high melt salt comprising at least one member selected from the group consisting of lithium fluoride, lithium chloride and potassium chloride.

11. A battery comprised of cells stacked in series, each cell having a positive and a negative electrode and separator that contain an electrolyte, each cell having an outer periphery and each cell being separated from adjacent cells by a bipolar wall such that each cell is bounded by first and second bipolar walls;
    a plurality of continuous edge seals, each edge seal being affixed to and encapsulating an outer edge of a bipolar wall; and
    an insulating gasket provided around the periphery of each cell, each gasket opening to a first end and opening to a second end opposite the first end, wherein the gasket first end is in contact with an edge seal on the first bipolar wall and the gasket second end is in contact with an edge seal on the second bipolar wall.

12. The battery of claim 11 wherein the gasket is continuous.

13. The battery of claim 11 wherein the edge seal and gasket are located a selected distance from the cell periphery so as to form a space therebetween.

14. The battery of claim 11 wherein the gasket is made of at least one member selected from the group consisting of boron nitride, aluminum nitride, titanium nitride, yttrium oxide, beryllium oxide, lithium fluoride, lithium chloride and potassium chloride.

15. The battery of claim 11 wherein the gasket is fabricated as an independent component.

16. The battery of claim 15 wherein at least one member selected from the group consisting of the gasket first end and gasket second end are adhered no seal material.

17. The battery of claim 11 wherein the gasket is formed directly upon the edge seal so as to be integral with the edge seal.

18. The battery of claim 17 wherein the gasket is formed by at least one member of the group consisting of sputtering, CVD, spraying and plasma spraying.

* * * * *